(12) United States Patent
Fujimoto et al.

(10) Patent No.: US 10,104,552 B2
(45) Date of Patent: Oct. 16, 2018

(54) WIRELESS RELAY DEVICE, WIRELESS COMMUNICATION SYSTEM, AND WIRELESS RELAY METHOD

(71) Applicant: Yokogawa Electric Corporation, Musashino-shi, Tokyo (JP)

(72) Inventors: Naoyuki Fujimoto, Tokyo (JP); Masato Yamaji, Tokyo (JP); Kenichi Takeda, Tokyo (JP); Masaki Shioya, Tokyo (JP); Yota Furukawa, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 130 days.

(21) Appl. No.: 15/081,138

(22) Filed: Mar. 25, 2016

(65) Prior Publication Data

US 2016/0295417 A1 Oct. 6, 2016

(30) Foreign Application Priority Data

Mar. 31, 2015 (JP) .................................. 2015-073056

(51) Int. Cl.
*H04L 29/06* (2006.01)
*H04W 12/10* (2009.01)
(Continued)

(52) U.S. Cl.
CPC ............ *H04W 12/10* (2013.01); *H04B 7/155* (2013.01); *H04W 12/02* (2013.01); *H04W 88/04* (2013.01)

(58) Field of Classification Search
CPC ....... H04W 12/10; H04W 12/02; H04B 7/155
See application file for complete search history.

(56) References Cited

U.S. PATENT DOCUMENTS

| 7,218,643 B1* | 5/2007 | Saito ...................... H04H 20/02 370/395.52 |
| 2008/0130577 A1* | 6/2008 | Park ....................... H04W 4/08 370/331 |

(Continued)

FOREIGN PATENT DOCUMENTS

| JP | 2004-200889 A | 7/2004 |
| JP | 2012-204893 A | 10/2012 |

(Continued)

OTHER PUBLICATIONS

Shuji Yamamoto, et al., "World's First Wireless Field Instruments Based on ISA100.11a", Yokogawa Technical Report, 2010, 8 pgs., vol. 53, No. 2.

*Primary Examiner* — Jeffrey Pwu
*Assistant Examiner* — Thong Truong
(74) *Attorney, Agent, or Firm* — Sughrue Mion, PLLC (57) ABSTRACT

A wireless relay device for relaying encrypted data via a wireless network according to one aspect of the present invention includes a relay controller and an encryption processor. The relay controller is configured to relay a first data to a predetermined relay destination as a second data via the wireless network. The first data is transmitted to the wireless relay device via the wireless network and is addressed to the wireless relay device. The encryption processor is configured to decrypt the first data into a decrypted first data and to input the decrypted first data into the relay controller, and encrypt the second data to be relayed by the relay controller.

13 Claims, 6 Drawing Sheets

(51) Int. Cl.
*H04B 7/155* (2006.01)
*H04W 12/02* (2009.01)
*H04W 88/04* (2009.01)

(56) References Cited

U.S. PATENT DOCUMENTS

| | | | |
|---|---|---|---|
| 2008/0285501 A1* | 11/2008 | Zhang | H04L 45/20 370/315 |
| 2009/0291685 A1 | 11/2009 | Morimoto | |
| 2011/0228720 A1 | 9/2011 | Ninagawa et al. | |
| 2013/0107794 A1 | 5/2013 | Yamada | |
| 2015/0163053 A1* | 6/2015 | Izu | H04L 9/14 713/168 |

FOREIGN PATENT DOCUMENTS

| | | |
|---|---|---|
| JP | 2013-98819 A | 5/2013 |
| WO | 2014/030186 A1 | 2/2014 |

* cited by examiner

WIRELESS RELAY DEVICE, WIRELESS
COMMUNICATION SYSTEM, AND
WIRELESS RELAY METHOD

BACKGROUND OF THE INVENTION

Field of the Invention

The present invention relates to a wireless relay device, a wireless communication system, and a wireless relay method.

Priority is claimed on Japanese Patent Application No. 2015-073056, filed on Mar. 31, 2015, the contents of which are incorporated herein by reference.

Description of Related Art

In a plant or a factory or the like, a distributed control system (DCS) has been implemented to realize a high level of automated operation. In the distributed control system, on-site devices (measures and actuators), which are referred to as field devices, are connected via a communication means to controllers, which control the field devices. The communication system which forms the base of such a distributed control system had been almost always one that communicates by cable. In recent years, a wireless communication system which communicates wirelessly in conformance with an industrial wireless communication standard such as ISA100.11 a or WirelessHART (registered trademark) has been realized.

Since such a wireless communication system is required to ensure the security, it is often the case that various data to be communicated via a wireless network is encrypted using cryptographic technology. For example, in the above-mentioned wireless communication system in conformance with ISA100.11a, an encryption is performed using encryption keys, which are distributed from a manager for managing a wireless network to each field device. Since the encryption keys distributed to each field device are different, a high degree of security is ensured.

Non-patent document 1 (Shuji Yamamoto and three others, "World's First Wireless Field Instruments Based on ISA100.11a", Yokogawa Technical Report, Vol. 53, No. 2, 2010) discloses the summary of the above-mentioned wireless communication system in conformance with ISA100.11a. In addition, the Non-patent document 1 discloses a gateway in which a gateway function, a system management function (system manager), a security management function (security manager), and the like are integrated. In this gateway, distribution and update of security keys (encryption keys) is performed by the security management function.

In the wireless communication system disclosed in the non-patent document 1, the encryption keys for encrypting and decrypting data, which is communicated via a wireless network, are stored into the gateway and field devices. Therefore, devices (for example, wireless rooters) disposed in the path between the gateway and the field devices cannot decrypt and confirm the encrypted data.

In the wireless communication system disclosed in the non-patent document 1, the following two methods for allowing operators to confirm various data (measured data, data indicating device state, and the like) acquired by field devices on site are considered.

(1) First Method Using Mobile Terminal Device

In the first method, operators operate a mobile terminal device, which is communicable to a field device, to make the mobile terminal device communicate with the field device, and to display the data acquired from the field device on the mobile terminal device.

(2) Second Method Performing Data Relay to Display Device

In the second method, the data, which has been transmitted from a field device to a gateway, is relayed from the gateway to a display device (for example, a display device which is capable of performing wireless communication and is portable) and displayed on the display device.

In the first method, the operation is required in which the operators visit the installation site of the field device and operate the mobile terminal device to acquire the data from the field device. Therefore, if the operators acquire data from a plurality of field devices, it is necessary to repeat the above-mentioned operation for each field device. In addition since, in some cases, the field device is installed at a site that is difficult to reach, the above-mentioned operation is difficult to do. Thus, it is considered that the first method has a difficulty in terms of the workability.

In the second method, since it is necessary to relay the data, which has been transmitted from the field device to the gateway (or a host control system) via a wireless network, to the display device via the wireless network again, the communication resource (for example, communication band) is wastefully exhausted. In addition, if the field device or wireless router uses a battery as a power source, the consumption of the battery is accelerated. Thus, in the second method, it is considered that the communication resource and the battery are wastefully exhausted.

In addition, in the wireless communication system disclosed in the non-patent document 1, if a system failure occurs in a system manager for managing a wireless network, the field device and the like are disconnected from the wireless network managed by the system manager. In this case, in the second method, the data transmission from the field device to the gateway and the data relay from the gateway to the display device cannot be performed. Thus, in the second method, if a system failure occurs in the system manager, it is considered that the various data acquired by the field device cannot be referred on site.

SUMMARY OF THE INVENTION

One aspect of the present invention provides a wireless relay device, a wireless communication system, and a wireless relay method, which can suppress the wasteful consumption of a communication resource and a battery and confirm encrypted data to be communicated via a wireless network.

A wireless relay device for relaying encrypted data via a wireless network according to one aspect of the present invention may include a relay controller and an encryption processor. The relay controller may be configured to relay a first data to a predetermined relay destination as a second data via the wireless network. The first data is transmitted to the wireless relay device via the wireless network and is addressed to the wireless relay device. The encryption processor is configured to decrypt the first data into a decrypted first data and to input the decrypted first data into the relay controller, and encrypt the second data to be relayed by the relay controller.

The wireless relay device may further include a first storage storing the decrypted first data.

In the wireless relay device, the relay controller may be configured to read the decrypted first data from the first storage and to relay the decrypted first data as the second data to the predetermined relay destination when a predetermined relay condition is satisfied.

The wireless relay device may further include an interface, to which an external device is connectable and a controller configured to read the decrypted first data from the first storage and to input the decrypted first data into the interface based on a request from the external device connected to the interface.

The wireless relay device the wireless relay device may join in a first wireless network. The wireless relay device may further include a manager configured to manage a second wireless network different from the first wireless network.

The wireless relay device may further include a second storage storing network management information, the manager using the network management information to manage the second wireless network.

The wireless relay device may further include a third storage storing transmission and reception setting information defining a transmission and reception timing via the second wireless network. The relay controller may be configured to perform a transmission and reception setting with respect to a transmission source of data and a transmission destination of data based on the transmission and reception setting information stored in the third storage.

The wireless relay device may further include an interface, to which an external device is connectable and a controller configured to read at least one of the decrypted first data stored in the first storage, the network management information stored in the second storage, and the transmission and reception setting information stored in the third storage, and to input the at least one of the decrypted first data, the network management information, and the transmission and reception setting information into the interface based on a request from the external device connected to the interface.

In the wireless relay device, the relay controller may be configured to perform a first wireless communication via the first wireless network using a first communication protocol and a second wireless communication via the second wireless network using a second communication protocol different from first communication protocol.

In the wireless relay device, when the manager receives a join request for the second wireless network from a wireless device, the manager may be configured to perform a join process for making the wireless device join in the second wireless network.

In the wireless relay device, the encryption processor may be configured to decrypt the first data using a different encryption key for each transmission source of the first data, and encrypt the second data using a different encryption key for each relay destination of the second data.

In the wireless relay device, the relay controller may be configured to perform a relay control with reference to a relay table in which the transmission source of the first data and the relay destination of the second data are associated with each other.

A wireless communication system for performing wireless communication via a wireless network according to one aspect of the present invention may include the above-mentioned wireless relay device and a gateway set as a transmission destination of the second data in the wireless relay device.

In the wireless communication system, the gateway may be configured to perform a setting of a relay table in which the transmission source of the first data and the relay destination of the second data are associated with each other.

In the wireless communication system, the wireless relay device may further include a first storage storing the decrypted first data.

In the wireless communication system, the relay controller may be configured to read the decrypted first data from the first storage and to relay the decrypted first data as the second data to the predetermined relay destination when a predetermined relay condition is satisfied.

In the wireless communication system, the wireless relay device may further include an interface, to which an external device is connectable and a controller configured to read the decrypted first data from the first storage and to input the decrypted first data into the interface based on a request from the external device connected to the interface.

In the wireless communication system, the wireless relay device may join in a first wireless network. The wireless relay device may further include a manager configured to manage a second wireless network different from the first wireless network.

A wireless relay method for relaying encrypted data via a wireless network according to one aspect of the present invention may include receiving a first data, the first data being transmitted to a wireless relay device via the wireless network and being addressed to the wireless relay device, decrypting the first data into a decrypted first data, performing a process for relaying the decrypted first data to a predetermined relay destination, encrypting the decrypted first data, which has been subjected to the process, into a second data, and transmitting the second data to the wireless network.

According to one aspect of the present invention, since a wireless relay device is provided in a wireless network, wherein the wireless relay device decrypts a first data, which is addressed to the wireless relay device and has been transmitted to the wireless relay device via the wireless network, into a decrypted first data, and encrypts the decrypted first data into a second data again and relays the second data to a predetermined relay destination via the wireless network, the one aspect of the present invention can suppress the wasteful consumption of a communication resource and a battery and confirm the encrypted data to be communicated via the wireless network.

DETAILED DESCRIPTION OF THE INVENTION

A wireless relay device, a wireless communication system, and a wireless relay method according to some embodiment of the present invention will be described in detail below, with references made to the drawings.

First Embodiment (Wireless Communication System)

Figure 1:
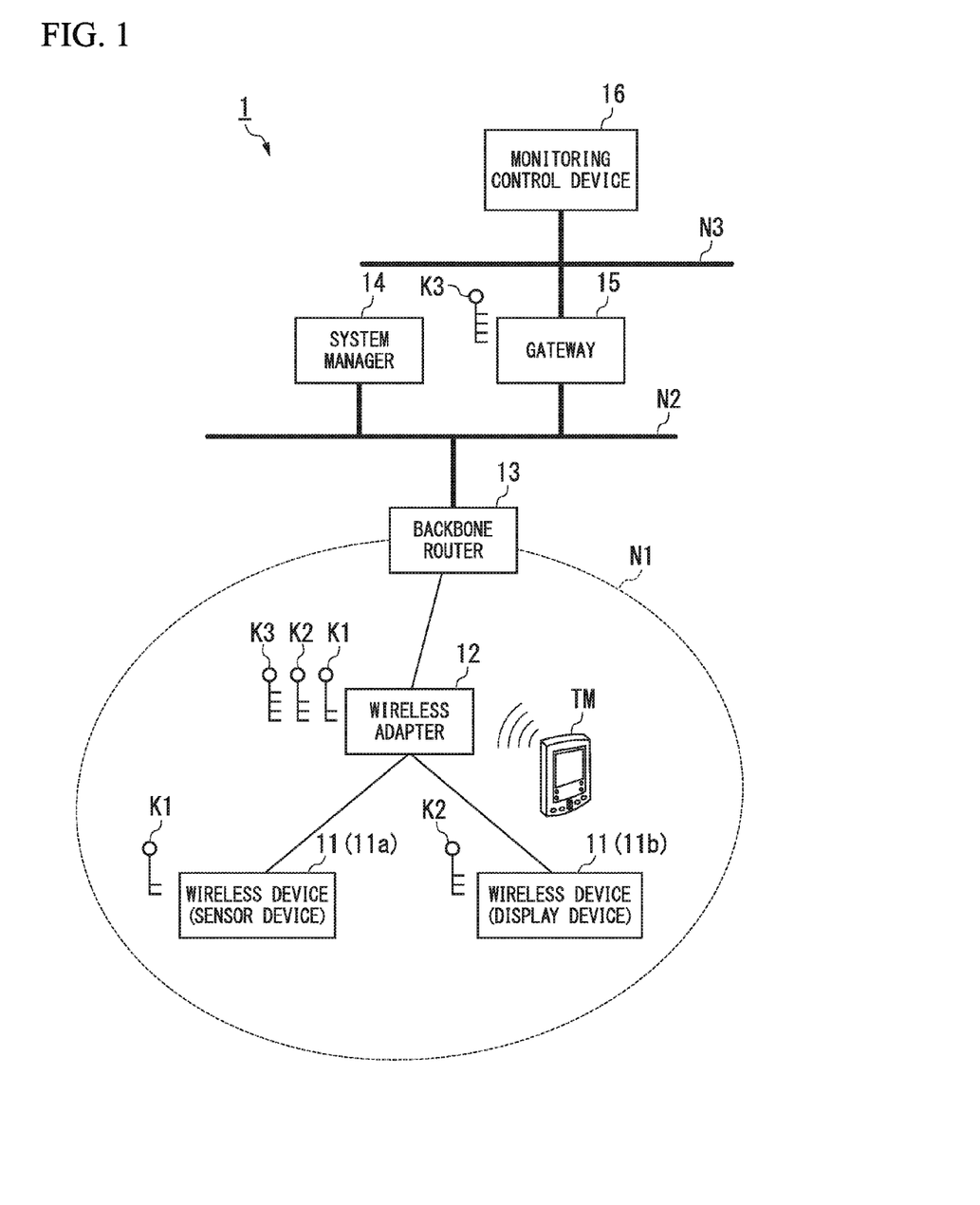
FIG. 1 is a block diagram showing the overall configuration of a wireless communication system according to a first embodiment of the present invention.

FIG. 1 is a block diagram showing the overall configuration of a wireless communication system according to the first embodiment of the present invention. As shown in FIG. 1, a wireless communication system 1 according to the present embodiment includes, for example, a wireless device 11, a wireless adapter 12 (wireless relay device), a backbone router 13, a system manager 14, a gateway 15, and a monitoring control device 16. The wireless communication system 1 having this configuration can wireless communication using a TDMA (Time Division Multiple Access) system via a wireless network N1.

The wireless communication system 1 is constructed in a plant or a factory or the like (hereinafter, collectively referred to simply as a plant). The plant includes, for example, in addition to an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, a dam, and the like.

The wireless network N1 is formed by devices installed at the site of the plant (the wireless device 11, the wireless adapter 12, and the backbone router 13) and managed by the system manager 14. In FIG. 1, the illustration is simplified, and the number of each of the wireless device 11, the wireless adapter 12, and the backbone router 13 is arbitrary.

In addition to the wireless network N1, a backbone network N2 and a control network N3 are provided in the plant where the wireless communication system 1 is constructed. The backbone network N2 is a main wired network of the wireless communication system 1, and the backbone router 13, the system manager 14, and the gateway 15 are connected to the backbone network N2. The control network N3 is a host wired network of the backbone network N2, and the gateway 15 and the monitoring control device 16 are connected to the control network N3. Each of the backbone network N2 and the control network N3 may be realized by a wireless communication network.

The wireless device 11 is installed at the site of the plant. The wireless device 11 includes a field device (wireless field device) for performing measurements, operations, and the like, which are required for the process control, under the control of the monitoring control device 16. In particular, the wireless device 11 includes a sensor device such as a flow gauge or temperature sensor, a valve device such as a flow control valve or open and close valve, an actuator device such as a fan or motor, an imaging device such as a camera or video for taking an image of a target or the situation in a plant, an acoustic device such as a microphone or speaker for collecting abnormal noise or the like in a plant or emitting a warning sound or the like, a position detection device for outputting position information of each device, and other devices. The wireless device 11 performs power-saving operations (for example, intermittent operations) using a battery as a power source and can perform a wireless communication using a TDMA system in conformance with a wireless communication standard ISA100.11a.

In FIG. 1, in order to facilitate the understanding, a single sensor device 11a, which is a wireless device 11 for measuring flow, and a single display device 11b, which is a wireless device 11 for displaying the data (sensor values) acquired from the sensor device 11a are shown. In order to ensure the security, different encryption keys are distributed to each of the sensor devices 11a and the display device 11b. In particular, an encryption key K1 is distributed to the sensor device 11a and an encryption key K2 is distributed to the display device 11b.

The encryption key K1 is used to perform encrypted communication between the sensor device 11a and the wireless adapter 12. The encryption key K2 is used to perform encrypted communication between the display device 11b and the wireless adapter 12. The system manger 14 distributes the encryption keys K1 and K2 to the sensor device 11a and the display device 11b, respectively, when the sensor device 11a and the display device 11b join in the wireless network N1.

The data transmission and reception setting is performed on the sensor device 11a and the display device 11b. In particular, in the sensor device 11a, the wireless adapter 12 is set as a transmission destination of data and a transmission timing (transmission interval) of data to the wireless adapter 12 is set. In the display device 11b, a reception timing (reception interval) of data is set. These settings are performed by the gateway 15 after the sensor device 11a and the display device 11b join in the wireless network N1.

The wireless adapter 12 can perform wireless communication in conformance with the wireless communication standard ISA100.11a, is communicatively connected to the wireless network N1, and performs a relay of data (encrypted data) via the wireless network N1. In particular, the wireless adapter 12 relays data, which has been transmitted to the wireless adapter 12 via the wireless network N1, to a predetermined relay destination via the wireless network N1. The destination of the data is the wireless adapter 12. For example, the wireless adapter 12 relays data, which has been transmitted from the sensor 11a to the wireless adapter 12, to the display device 11b and the gateway 15 via the wireless network N1. The destination of the data is the wireless adapter 12.

When the wireless adapter 12 performs the above-mentioned relay process, the wireless adapter 12 decrypts the data (first data) into a decrypted data, which has been transmitted to the wireless adapter 12, encrypts the decrypted data again to generate new data (second data), and relays the new data to the predetermined relay destination. The destination of the data (first data) is the wireless adapter 12. These decryption and encryption are performed for ensuring the security and allowing the encrypted data, which is to be communicated via the wireless network N1, to be referred on the site of the plant. The data decrypted by the wireless adapter 12 is accumulated in the wireless adapter 12.

As shown in FIG. 1, in order to ensure the security, a plurality of encryption keys, which are different from each other, are distributed to the wireless adapter 12. In particular, in addition to the above-mentioned encryption keys K1 and K2, an encryption key K3 is distributed to the wireless adapter 12. The encryption key K3 is used to perform encrypted communication between the wireless adapter 12 and the gateway 15. The system manager 14 distributes the encryption keys K1, K2, and K3 to the wireless adapter 12 when the wireless adapter 12 joins in the wireless network N1.

A relay table TB used in the above-mentioned relay process (refer to FIG. 2) is set in the wireless adapter 12. In the relay table TB, a transmission source of data (the transmission source for transmitting data to the wireless adapter 12) is associated with a relay destination of the data. For example, in the relay table TB, the sensor 11a as a transmission source of data is associated with the display device 11b and the gateway 15 as a relay destination of the data. The setting of the relay table TB is performed by the gateway 15 after the wireless adapter 12 joins in the wireless network N1.

The wireless adapter 12 can communicate with a smartphone, a tablet computer, and an information terminal device TM (external device) such as a laptop computer. For example, the wireless adapter 12 can perform wirelessly communication with the information terminal device TM such as infrared communication and NFC (Near Field Communication). The wireless adapter 12 may perform wired communication such as USB (Universal Serial Bus) communication. The wireless adapter 12 inputs the data accumulated in the wireless adapter 12 into the information terminal device TM based on the requests from the information terminal device TM. The internal configuration of the wireless adapter 12 will be described later.

The backbone router 13 connects the wireless network N1 and the backbone network N2, and performs the relay of the data to be transmitted and received between the wireless network N1 and the backbone network N2. The backbone router 13 also performs the above-mentioned wireless communication in conformance with wireless communication standard ISA100.11a.

The system manager 14 controls the wireless communication via the wireless network N1. In particular, the system manager 14 performs allocation control of communication resource (time slots and communication channels) to the wireless device 11, the wireless adapter 12, the backbone router 13, and the gateway 15 and realizes the wireless communication using a TDMA system via the wireless network N1. The system manager 14 performs a process (join process) for determining whether making the wireless device 11, the wireless adapter 12, and the backbone router 13 join in the wireless network N1. When the system manger 14 makes the wireless device 11, the wireless adapter 12, and the backbone router 13 join in the wireless network N1, the system manger 14 performs the distribution of the above-mentioned encryption keys K1 to K3.

The gateway 15 connects the backbone network N2 and the control network N3 and performs the relay of various data to be transmitted and received between the monitoring control device 16, and the wireless network N1, the system manager 14, and the like. The installation of the gateway 15 enables the backbone network N2 and the control network N3 to be connected to each other while ensuring the security. The gateway 15 performs the above-mentioned transmission and reception setting of data with respect to the sensor device 11a and the display device 11b joining in the wireless network N1. The gateway 15 performs the above-mentioned setting of the relay table TB with respect to the wireless adapter 12 joining in the wireless network N1. The above-mentioned encryption key K3 is distributed to the gateway 15 to secure the security.

The monitoring control device 16 monitors and manages the wireless device 11 and the like. In particular, the monitoring control device 16 collects various data transmitted from the wireless device 11 via the gateway 15 (for example, the data transmitted from the sensor device 11a) to monitor the wireless device 11 and the like. The monitoring control device 16 calculates a control amount of the wireless device 11 based on the collected various data and transmits control data, which indicates the control amount, to the wireless device 11 via the gateway 15 at constant time interval to control the wireless device 11.

(Wireless Relay Device)

Figure 2:
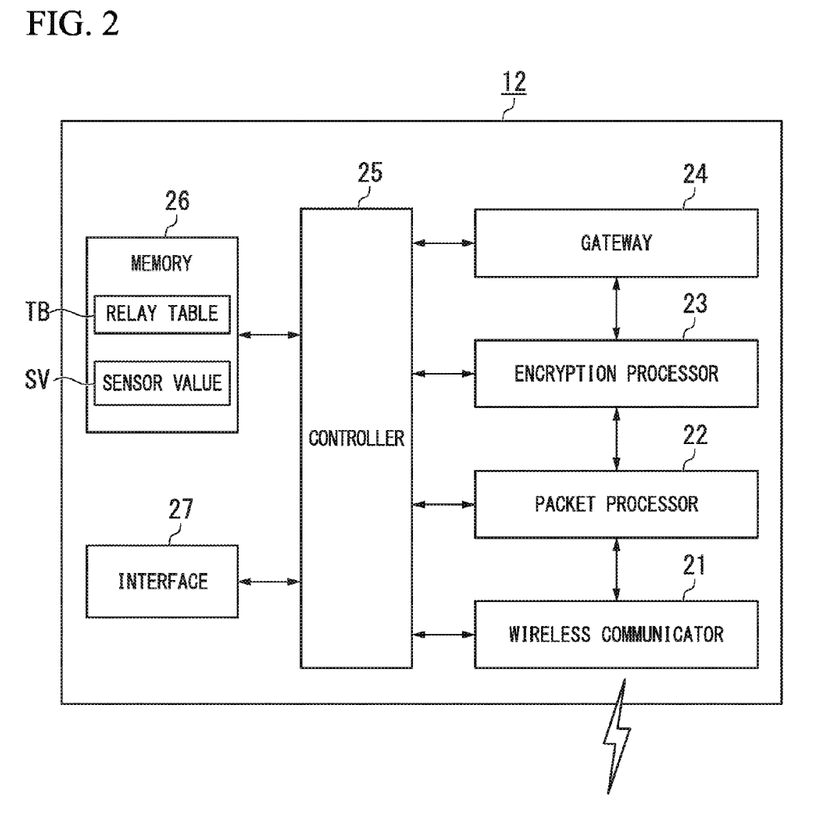
FIG. 2 is a block diagram showing the main parts of the configuration of a wireless adapter as a wireless relay device according to the first embodiment of the present invention.

FIG. 2 is a block diagram showing the main parts of the configuration of a wireless adapter as a wireless relay device according to the first embodiment of the present invention. As shown in FIG. 2, the wireless adapter 12 includes, for example, a wireless communicator 21, a packet processor 22, an encryption processor 23, a gateway 24 (relay controller), a controller 25, a memory 26 (first storage), and an interface 27, and performs the relay of encrypted data via the wireless network N1.

The wireless communicator 21 performs transmission and reception of wireless signal under the control of the controller 25. In particular, the wireless communicator 21 receives data (packets), which has been transmitted the wireless communicator 21 as wireless signals via the wireless network N1, converts data (packets), which should be transmitted via the wireless network N1, into wireless signals, and transmits the wireless signals. The packet processor 22 performs a relay process of packets to be transmitted and received by the wireless communicator 21 under the control of the controller 25. In particular, when the packets received by the wireless communicator 21 are addressed to its own device (the packets addressed to the gateway 24 in the wireless adapter 12), the packet processor 22 inputs the packets into the encryption processor 23. On the other hand, when the packets received by the wireless communicator 21 are not addressed to its own device (the packets are not addressed to the gateway 24 in the wireless adapter 12), the packet processor 22 inputs the packets into the wireless communicator 21. The packet processor 22 inputs data, which has been outputs from the encryption processor 23 and should be transmitted via the wireless network N1, into the wireless communicator 21.

The encryption processor 23 performs an encryption process using the encryption keys K1 to K3 shown in FIG. 1, under the control of the controller 25. In particular, the encryption processor 23 decrypts data output from the packet processor 22, inputs the decrypted data into the gateway 24, encrypts data output from the gateway 24, and inputs the encrypted data into the packet processor 22. For example, the encryption processor 23 decrypts data, which has been transmitted from the sensor device 11a via the wireless network N1 and is addressed to its own device, using the encryption key K1, and inputs the decrypted data into the gateway 24. The encryption processor 23 encrypts data, which has been output from the gateway 24 and should be transmitted to the display device 11b, using the encryption key K2, and inputs the encrypted data into the packet processor 22. The encryption processor 23 encrypts data, which has been output from the gateway 24 and should be transmitted to the gateway 15, using the encryption key K3, and inputs the encrypted data into the packet processor 22.

The gateway 24 performs a relay process of data, which has been transmitted to its own device and is addressed to its own device, using the relay table TB stored in the memory 26. For example, the gateway 24 relays data, which has been transmitted from the sensor device 11a and is addressed to its own device, to the display device 11b and the gateway 15 using the relay table TB. When a relay condition previously set by the gateway 15 is satisfied (for example, when a predetermined relay timing has come), the gateway 24 reads the data (sensor value SV) stored in the memory 26 and performs the relay process. The reason for performing such a relay process is that the data required for the monitoring of the wireless device 11 and the like may be collected at a certain amount of time interval and a strict real-time collection is not required.

The controller 25 totally controls the operations of the wireless adapter 12. For example, the controller 25 controls the wireless communicator 21, the packet processor 22, the encryption processor 23, and the gateway 24 to make them the above-mentioned relay control. The controller 25 performs control to read the sensor value SV from the memory 26 and input the sensor value SV into the information terminal device TM shown in FIG. 1 based on the requests from the information terminal device TM.

The memory 26 is, for example, a non-volatile semiconductor memory, and stores the above-mentioned relay table TB used by the gateway 24, the data (sensor value SV) decrypted by the encryption processor 23, and the like. The sensor value SV stored in the memory 26 includes, for example, the following information.

Sensor value: measured results of the sensor device 11a (for example, flow rate)

Sensor status: information indicating the status of the sensor device 11a

Transmission time: a time when the sensor device 11a has transmitted data

Reception time: a time when the wireless adapter 12 has received data from the sensor device 11a Sequence number: a number indicating the sequence of packets The interface 27 connects the information terminal device TM to the wireless adapter 12. The interface 27 can perform wirelessly communication including, for example, infrared communication, and NFC. The interface 27 may perform wired communication such USB communication.

(Wireless Relay Method)

Figure 3:
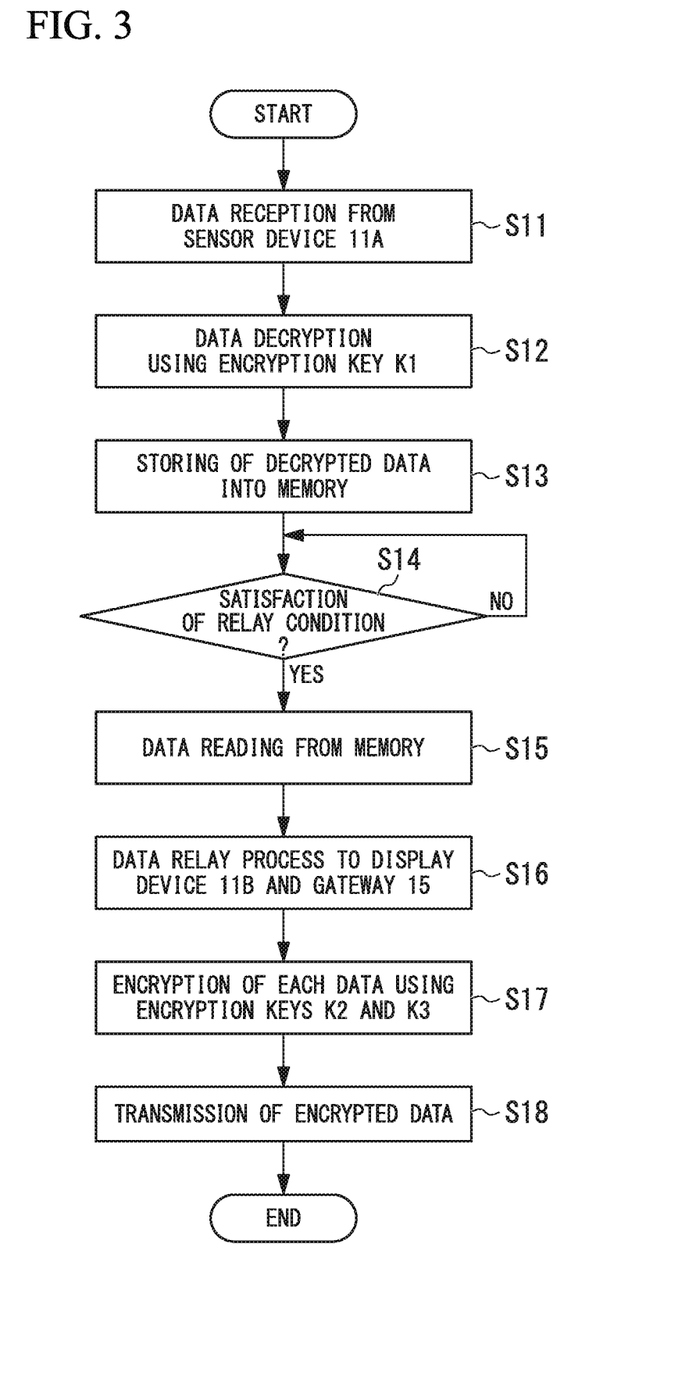
FIG. 3 is a flowchart showing an example of a wireless relay method according to the first embodiment of the present invention.

FIG. 3 is a flowchart showing an example of a wireless relay method according to the first embodiment of the present invention. Hereinafter, an example will be described in which the data (sensor value) transmitted from the sensor device 11a is relayed to the display device 11b and the gateway 15 (monitoring control device 16). The flowchart shown in FIG. 3 is started when the data transmitted from the sensor device 11a is input into the wireless adapter 12.

When the process is started, first, the wireless communication 21 in the wireless adapter 12 receives data, which has been transmitted from the sensor device 11a via the wireless network N1 (step S11: first step). The data received by the wireless communication 21 is input into the packet processor 22. The data transmitted from the sensor device 11a is addressed to the wireless adapter 12 (the data addressed to the gateway 24 in the wireless adapter 12). Therefore, the data, which has been input into the packet processor 22, is input into the encryption processor 23.

Next, the encryption processor 23 decrypts the data, which has been transmitted from the sensor device 11a, using the encryption key K1 (refer to FIG. 1) (step S12: second step). The decrypted data is output from the encryption processor 23 to the controller 25 and stored in the memory 26 as a sensor value SV (step S13). Subsequently, the controller 25 determines whether the relay condition is satisfied (step S14). For example, the controller 25 determines whether a predetermined relay timing has come.

When the controller 25 determines that the relay condition is not satisfied (the determination result is "NO"), the process of the step S14 is repeated. While the process of the step S14 is repeated, the data transmitted from the sensor device 11a is stored and accumulated in the memory 26 as a sensor value SV. On the other hand, when the controller 25 determines that the relay condition is satisfied (the determination result is "YES"), the controller 25 reads the sensor value SV from the memory 26 and inputs the sensor value SV into the gateway 24 (step S15). Next, the gateway 24 performs a data relay process of data to the display device 11b and the gateway 15 (step S16: third step). In particular, the gateway 24 performs a process for relaying the data read from the memory 26 to each of the display device 11b and the gateway 15.

After the gateway 24 performs the above-mentioned relay process, the gateway 24 sequentially inputs first data to be relayed to the display device 11b and second data to be relayed to the gateway 15 into the encryption processor 23. Next, the encryption processor 23 encrypts the first data to be relayed to the display device 11b using the encryption key K2 and the second data to be relayed to the gateway 15 using the encryption key K3 (step S17: fourth step). The encryption processor 23 inputs the encrypted data into the wireless communicator 21 via the packet processor 22 and the encrypted data is transmitted to the wireless network N1 as a wireless signal (step S18: fifth step).

The data, which has been transmitted from the wireless adapter 12 as a wireless signal, is received by each of the display device 11b and the backbone router 13. The data received by the display device 11b is decrypted using the encryption key K2 distributed to the display device 11b and displayed on the display device 11b. On the other hand, the data received by the backbone router 13 is received by the gateway 15 via the backbone network N2 and is decrypted using the encryption key K3 distributed to the gateway 15. The monitoring control device 16 collects the decrypted data from the gateway 15 via the control network N3.

Hereinafter, the case in which operators in the site operate the information terminal device TM and instruct to acquire the sensor value SV near the installation site of the wireless adapter 12 will be considered. In this case, the communication between the information terminal device TM and the wireless adapter 12 is started and the information terminal device TM is connected to the interface 27 in the wireless adapter 12. Next, the information terminal device TM transmits a transmission request of the sensor value SV to the controller 25 in the wireless adapter 12. When the controller 25 receives the transmission request, the controller 25 reads the sensor value SV from the memory 26 and performs control to make the interface 27 transmit the sensor value SV to the information terminal device TM.

As described above, in the present embodiment, the wireless adapter 12 having the gateway function is installed in the wireless network N1, the data, which has been transmitted from the sensor device 11a to the wireless adapter 12 and is addressed to the wireless adapter 12, is decrypted, and then, the decrypted data is encrypted and relayed to the display device 11b and the gateway 15. Therefore, the wasteful consumption of the communication resource and battery can be suppressed compared with a prior art and the encrypted data to be communicated via the wireless network N1 can be referred on the site.

In addition, in the present embodiment, the memory 26 is provided in the wireless adapter 12, the data decrypted by the wireless adapter 12 is accumulated in the wireless adapter 12, and the data accumulated in the wireless adapter 12 can be acquired by the information terminal device TM. Thereby, even if the failure of the system manager 14 occurs, the data accumulated in the wireless adapter 12 before the failure occurs can be acquired. The wireless adapter 12 is installed at an accessible site, and thereby, the data accumulated in the wireless adapter 12 can be acquired easily.

Second Embodiment (Wireless Communication System)

Figure 4:
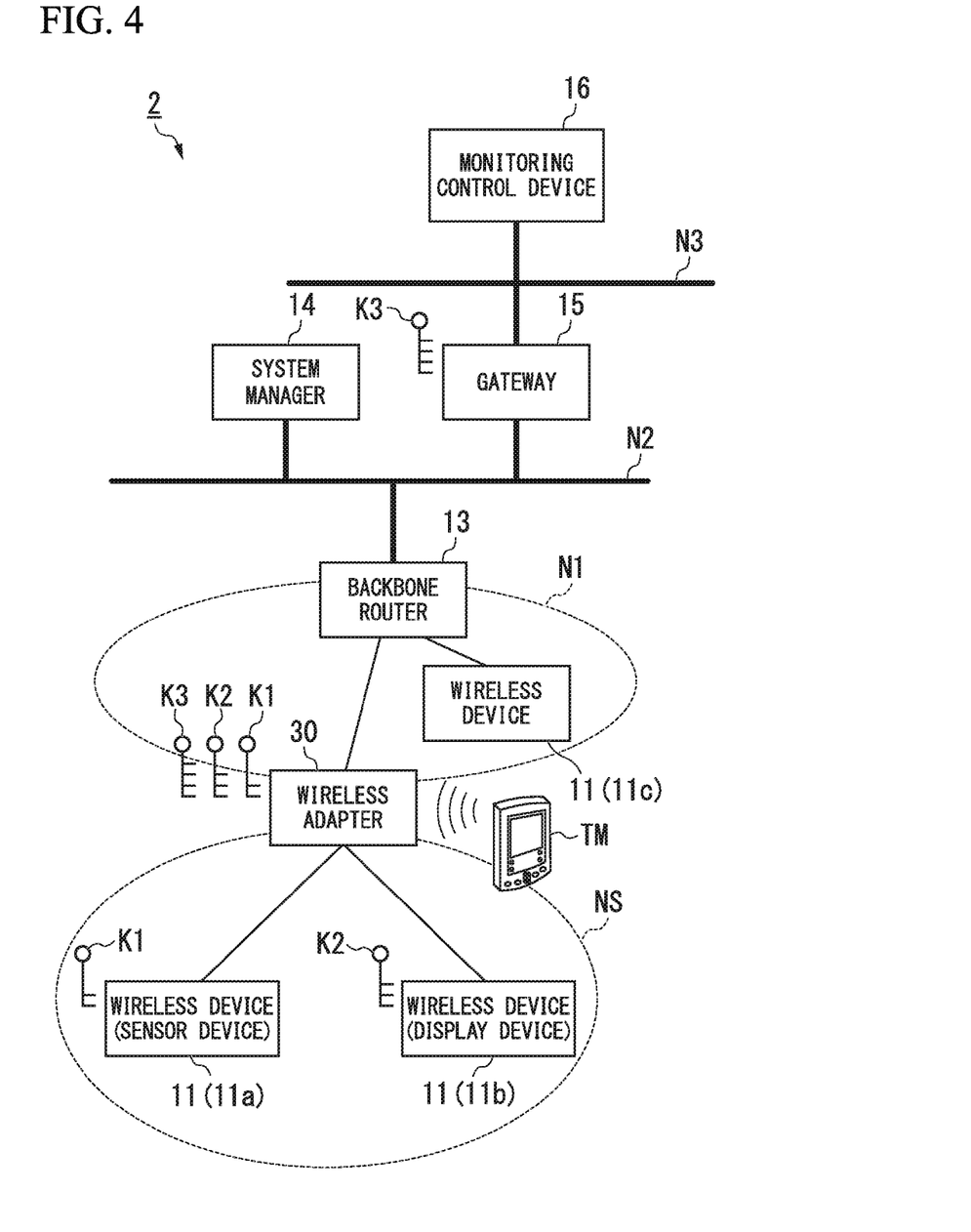
FIG. 4 is a block diagram showing the overall configuration of a wireless communication system according to a second embodiment of the present invention.

FIG. 4 is a block diagram showing the overall configuration of a wireless communication system according to the second embodiment of the present invention. In FIG. 4, blocks that correspond to those in FIG. 1 are assigned the same reference numerals, the description will be omitted. As shown in FIG. 4, a wireless communication system 2 according to the present embodiment includes a wireless adapter 30 instead of the wireless adapter 12 in the wireless communication system 1 shown in FIG. 1, and manages, using the wireless adapter 30, a sub wireless network NS (second wireless network) different from the wireless network N1 (first wireless network), in which the wireless adapter 30 joins.

The reason for performing such a control is that, even if the failure of the system manager 14 occurs and the operation of the wireless network N1 is stopped, the operation of the sub wireless network NS managed by the wireless adapter 30 is continued. That is, the wireless communication system 2 according to the present embodiment make the wireless adapter 30 continue the operation of the sub wireless network NS. Therefore, even if the failure of the system manager 14 occurs, the encrypted data to be communication via the sub wireless network NS can be referred.

The wireless adapter 30 is one in which a function to manage the sub wireless network NS is added to the wireless adapter 12 shown in FIG. 1. That is, similar to the wireless adapter 12, the wireless adapter 30 can perform a wireless communication in conformance with a wireless communication standard ISA100.11a, and perform date relay (relay of encrypted data via the wireless network N1 and the sub wireless network NS), data decryption, and data encryption. In addition, similar to the wireless adapter 12, the wireless adapter 30 can communicate with the information terminal device TM such as a smartphone.

In addition, the wireless adapter 30 manages the sub wireless network NS. In particular, the wireless adapter 30 performs allocation control of communication resource (time slots and communication channels) to the wireless device 11 joining in the sub wireless network NS, a join process of the wireless device 11, distribution of the encryption keys K1 and K2 to the wireless device 11. The encryption keys K1 and K2 to be distributed by the wireless adapter 30 are previously distributed to the wireless adapter 30 from the system manager 14.

Hereinafter, as shown in FIG. 4, an example will be described in which the sensor device 11a and the display device 11b join in the sub wireless network NS managed by the wireless adapter 30. In FIG. 4, a wireless device 11 joining in the wireless network N1, which is managed by the system manager 14, is shown as a "wireless device 11c".

(Wireless Relay Device)

Figure 5:
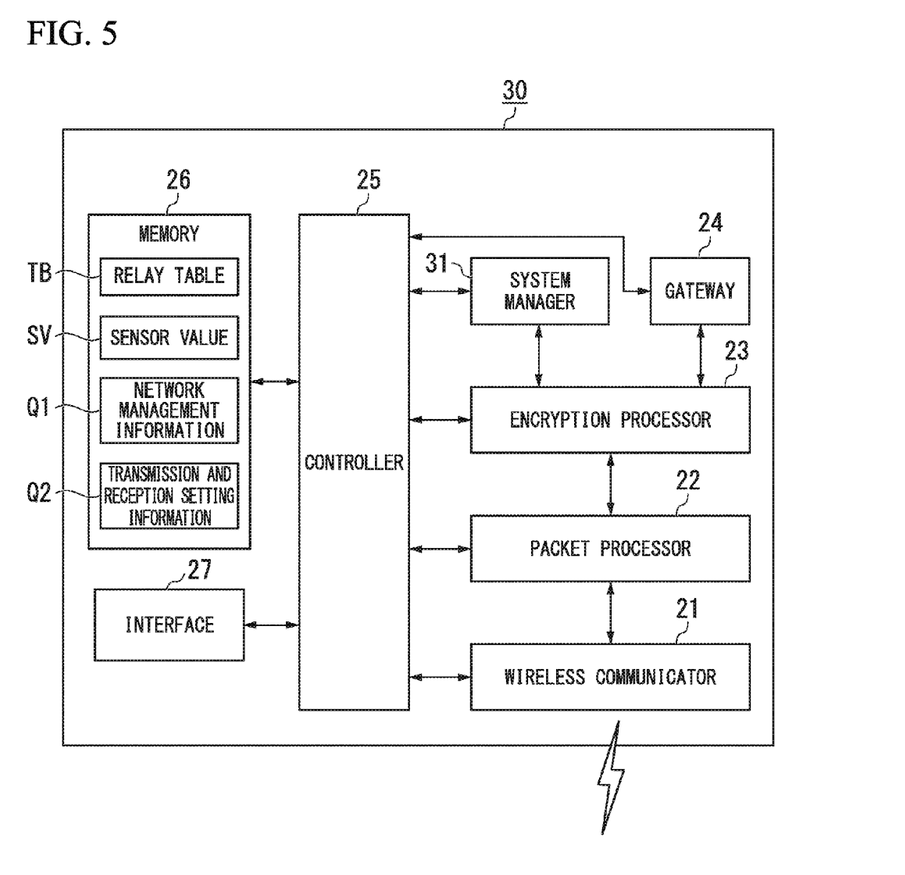
FIG. 5 is a block diagram showing the main parts of the configuration of a wireless adapter as a wireless relay device according to the second embodiment of the present invention.

FIG. 5 is a block diagram showing the main parts of the configuration of a wireless adapter as a wireless relay device according to the second embodiment of the present invention. In FIG. 5, blocks that correspond to those in FIG. 2 are assigned the same reference numerals, the description will be omitted. As shown in FIG. 5, the wireless adapter 30 is one in which a system manager 31 (manager) is added to the wireless adapter 12 shown in FIG. 2 and network management information Q1 and transmission and reception setting information Q2 are stored in the memory 26 (second storage, third storage).

The system manager 31 manages the sub wireless network NS under the control of the controller 25. In particular, the system manager 31 performs allocation control of communication resource (time slots and communication channels) to the sensor device 11a and the display device 11b and realizes wireless communication using a TDMA system via the sub wireless network NS. When the system manage 31 receives join requests to the sub wireless network NS, the system manager 31 performs a process (join process) for determining whether making the sensor device 11a and the display device 11b join in the sub wireless network NS. When the system manger 31 makes the sensor device 11a and the display device 11b join in the sub wireless network NS, the system manger 31 performs the distribution of the above-mentioned encryption keys K1 and K2.

The network management information Q1 stored in the memory 26 is used by the system manager 31 to manage the sub wireless network NS, and includes, for example, the following information.

Subnet ID: an identifier to be allocated to the sub wireless network NS

Join key: an authentication key used in the join process of the sub wireless network NS Role: a role of the wireless device 11 (field device or wireless router)

Route information: information indicating the wireless device 11 (communication source and communication destination), which is a communication target Communication channel (hopping pattern): a list of channels to be used The transmission and reception setting information Q2 stored in the memory 26 is for defining the data transmission and reception timing via the sub wireless network NS, and includes, for example, the following information. The transmission and reception setting information Q2 is used by the gateway 24 after the system manager 31 finishes the join process.

Update cycle: a cycle of data transmission and reception

Transmission and reception device: a device for performing data transmission and reception Transmission and reception timing (Phase) information: information indicating a transmission and reception timing Similar to the controller 25 in the wireless adapter 12 shown in FIG. 2, the controller 25 in the wireless adapter 30 reads the sensor value SV from the memory 26 and performs control to input the sensor value SV into the information terminal device TM shown in FIG. 4 based on the requests from the information terminal device TM. In addition, the controller 25 in the wireless adapter 30 reads at least one of the network management information Q1 and the transmission and reception setting information Q2 from the memory 26 and performs control to input it into the information terminal device TM, in addition to or instead of the sensor value SV stored in the memory 26.

(Wireless Relay Method)

(Normal State)

In the normal state in which the failure of the system manager 14 does not occur and the wireless communication via the wireless network N1 is available, the wireless adapter 30 performs the same operations as those described with reference to FIG. 3. That is, when the data addressed to the wireless adapter 30 (the data addressed to the gateway 24 in the wireless adapter 30), is transmitted from the sensor device 11a via the sub wireless network NS, the data is received by the wireless communicator 21 in the wireless adapter 30 (step S11). The received data is decrypted by the encryption processor 23 using the encryption key K1 (step S12), and stored in the memory 26 as the sensor value SV (step S13).

Subsequently, the controller 25 determines whether the relay condition is satisfied (step S14). When the controller 25 determines that the relay condition is satisfied (the determination result is "YES"), the controller 25 reads the sensor value SV from the memory 26 (step S15), and the gateway 24 performs a process (relay process) to relay the sensor value SV to the display device 11b and the gateway 15 (step S16). Subsequently, the encryption processor 23 encrypts data to be relayed to the display device 11b using the encryption key K2 and data to be relayed to the gateway 15 using the encryption key K3 (step S17). Finally, the wireless communicator 21 transmits the encrypted data to each of the sub wireless network NS and the wireless network N1 as a wireless signal (step S18).

First data transmitted from the wireless adapter 30 to the sub wireless network NS is received by the display device 11b, and second data transmitted from the wireless adapter 30 to the wireless network N1 is received by the backbone router 13. The first data received by the display device 11b is decrypted using the encryption key K2 distributed to the display device 11b and is displayed on the display device 11b. On the other hand, the second data received by the backbone router 13 is passed through the backbone network N2, is received by the gateway 15, and is decrypted using the encryption key K3 distributed to the gateway 15. The gateway 15 transmits the decrypted data to the monitoring control device 16 via the control network N3 and the monitoring control device 16 collects it.

Hereinafter, the case in which operators in the site operate the information terminal device TM and instruct to acquire at least one of the sensor value SV, the network management information Q1, and the transmission and reception setting information Q2 near the installation site of the wireless adapter 30 will be considered. In this case, the information terminal device TM is connected to the interface 27 in the wireless adapter 30, and the information terminal device TM transmits the transmission request of the instructed information to the controller 22 in the wireless adapter 30. When the controller 25 receives the transmission request, the controller 25 reads the sensor value SV from the memory 26 and performs control to make the interface 27 transmit the sensor value SV to the information terminal device TM.

(Failure Occurrence State)

If the failure of the system manager 14 occurs, the operation of the wireless network N1 is stopped, and the wireless adapter 30 is disconnected from the wireless network N1. Thereby, the data transmission from the wireless adapter 30 to the gateway 15 becomes impossible. However, even if the operation of the wireless network N1 is stopped, the operation of the sub wireless network NS, which is managed by the wireless adapter 30, is continued. Therefore, the data transmission from the sensor device 11a to the wireless adapter 30, the data accumulation in the wireless adapter 30 (the accumulation of the sensor value SV), and the data transmission from the wireless adapter 30 to the display device 11b are continued. Such an operation is continued until the system manager 14 is restored.

Figure 6:
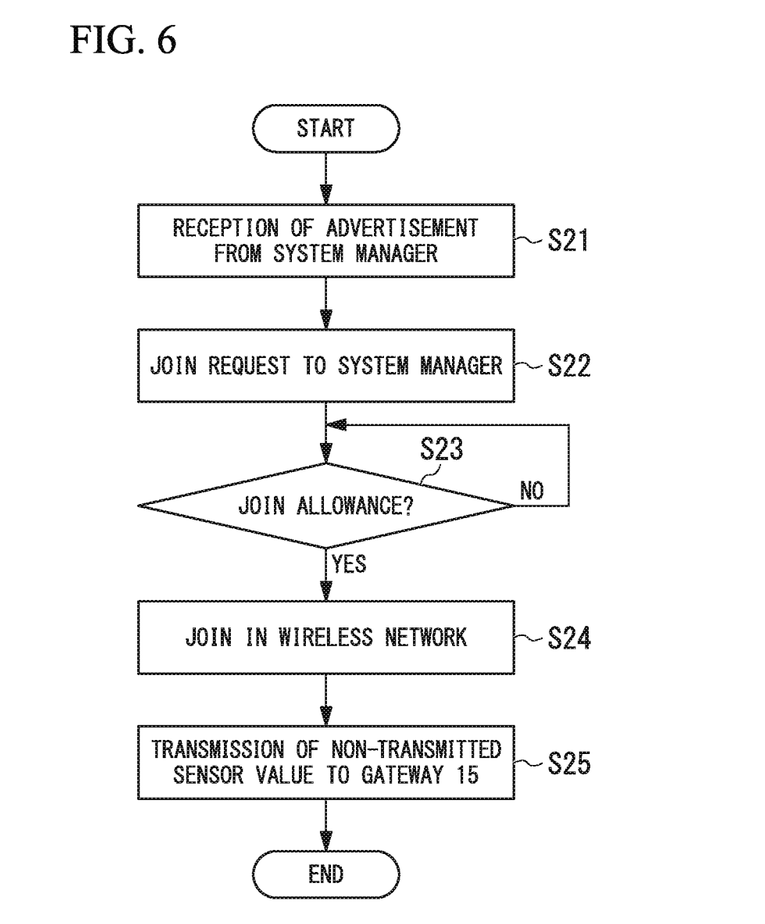
FIG. 6 is a flowchart showing operations at the time of failure restoration of the wireless adapter as a wireless relay device according to the second embodiment of the present invention.

FIG. 6 is a flowchart showing operations at the time of failure restoration of the wireless adapter as a wireless relay device according to the second embodiment of the present invention. When the system manager 14 is restored, the system manager 14 regularly transmits an advertisement (information required to allow the wireless device 11c and the wireless adapter 30 to join in the wireless network N1). The flowchart shown in FIG. 6 is started when the advertisement from the system manager 14 is input into the wireless adapter 30.

When the process is started, first, the wireless communicator 21 receives the advertisement transmitted from the system manager 14 (step S21). The information included in the received advertisement is input into the controller 25. Next, the controller 25 performs control to transmit a join request for the wireless network N1 to the system manager 14 (step S22). Subsequently, the controller 25 determines whether receiving a join allowance (information indicating that the join in the wireless network N1 is allowed) from the system manager 14 (step S23).

When the controller 25 determines that the controller 25 does not receive the join allowance (the determination result is "NO"), the process of step S23 is repeated. When the controller 25 receives a join rejection (information indicating that the join in the wireless network N1 is rejected) from the system manager 14, a series of processes shown in FIG. 6 is finished. On the other hand, the controller 25 determines that the controller 25 receives the join allowance (the determination result is "YES"), the controller 25 performs control to join in the wireless network N1 (step S24).

Subsequently, the controller 25 performs control to sequentially transmit, to the gateway 15, non-transmitted sensor values SV, which are not transmitted to the gateway 15, among the sensor values SV stored in the memory 26 (step S25). That is, the sensor values SV are sequentially transmitted, which were stored in the wireless adapter 30 after the failure of the system manager 14 have occurred and the operation of the wireless network N1 has been stopped. After the above-mentioned process is finished, the above-mentioned operation in the normal state is started.

As described above, in the present embodiment, the wireless adapter 30, which has, in addition to the gateway function, the system manager function, is installed in the wireless network N1, and the sub wireless network NS, which is different from the wireless network N1, is managed. Thereby, in the normal state in which the failure of the system manager 14 does not occur, similar to the first embodiment, the data is decrypted, which has been transmitted from the sensor device 11a to the wireless adapter 30 and is addressed to the wireless adapter 30, and then, the decrypted data is encrypted and relayed to the display device 11b and the gateway 15. Therefore, the wasteful consumption of the communication resource and battery can be suppressed compared with a prior art and the encrypted data to be communicated via the wireless network N1 can be referred on the site.

In addition, in the failure occurrence state in which the failure of the system manager 14 occurs, even if the operation of the wireless network N1 is stopped, the operation of the sub wireless network NS is continued. Thereby, the data transmission from the wireless device 30 to the gateway 15 becomes impossible, but the data transmission from the sensor device 11a to the wireless adapter 30, the data accumulation in the wireless adapter 30 (the accumulation of the sensor value SV), and the data transmission from the wireless adapter 30 to the display device 11b are continued. Therefore, even if the failure of the system manager 14 occurs, the encrypted data to be communicated via the sub wireless network NS can be referred on the site.

In addition, in the present embodiment, when the system manager 14 is restored, among the sensor values SV stored in the wireless adapter 30, the non-transmitted sensor values SV, which are not transmitted to the gateway 15, are sequentially transmitted to the gateway 15. Therefore, all data, which has been acquired by the sensor device 11a during the period from the occurrence of the failure of the system manager 14 to the restoration, can be transmitted to the gateway 15.

Hereinbefore, the wireless relay device, the wireless communication system, and the wireless relay method in accordance with some embodiments of the present invention are described, but the present invention is not limited to the embodiments, and various modifications are included without departure from the spirit of the present invention. For example, in the second embodiment, a first communication protocol used for a first wireless communication via the wireless network N1 and a second communication protocol used for a second wireless communication via the sub wireless network NS may be same as each other or different from each other.

In the second embodiment, both of the first communication protocol used for the first wireless communication via the wireless network N1 and the second communication protocol used for the second wireless communication via the sub wireless network NS are in conformance with a wireless communication standard ISA100.11a. However, for example, the first communication protocol used for the first wireless communication via the wireless network N1 may be in conformance with a wireless communication standard ISA100.11a and the second communication protocol used for the second wireless communication via the sub wireless network NS may be in conformance with a WirelessHART (registered trademark) or a ZigBee (registered trademark).

In addition, in the second embodiment, time synchronization of the system manager 14 and the wireless adapter 30 may be, or may not be performed. If the time synchronization of the system manager 14 and the wireless adapter 30 is performed, the interference of the first wireless communication via the wireless network N1 and the second wireless communication via the sub wireless network NS can be prevented. If the time synchronization of the system manager 14 and the wireless adapter 30 is not performed, there are some cases where the data transmission is failed due to the above-mentioned interference. However, this failure can be overcome by performing data retransmission or the like.

In addition, in the first and second embodiments, the example was described in which each of the backbone router 13, the system manager 14, and the gateway 15 is realized as a separate device. However, any two or more of them may be realized as a single device.

What is claimed is:

1. A wireless relay device for relaying encrypted data via a wireless network, comprising:
   a relay controller configured to relay a first data to a predetermined relay destination as a second data via the wireless network, the first data being transmitted to the wireless relay device via the wireless network and being addressed to the wireless relay device;
   an encryption processor configured to decrypt the first data into a decrypted first data and to input the decrypted first data into the relay controller, and encrypt the second data to be relayed by the relay controller;
   a first storage storing the decrypted first data;
   a manager configured to manage a second wireless network different from a first wireless network in which the wireless relay device joins;
   a second storage storing network management information, the manager using the network management information to manage the second wireless network; and
   a third storage storing transmission and reception setting information defining a transmission and reception timing via the second wireless network,
   wherein the relay controller is configured to perform a transmission and reception setting with respect to a transmission source of data and a transmission destination of data based on the transmission and reception setting information stored in the third storage.

2. The wireless relay device according to claim 1, wherein the relay controller is configured to read the decrypted first data from the first storage and to relay the decrypted first data as the second data to the predetermined relay destination when a predetermined relay condition is satisfied.

3. The wireless relay device according to claim 1, further comprising:
   an interface, to which an external device is connectable; and
   a controller configured to read the decrypted first data from the first storage and to input the decrypted first data into the interface based on a request from the external device connected to the interface.

4. The wireless relay device according to claim 1, further comprising:
   an interface, to which an external device is connectable; and
   a controller configured to read at least one of the decrypted first data stored in the first storage, the network management information stored in the second storage, and the transmission and reception setting information stored in the third storage, and to input the at least one of the decrypted first data, the network management information, and the transmission and reception setting information into the interface based on a request from the external device connected to the interface.

5. The wireless relay device according to claim 1, wherein the relay controller is configured to perform a first wireless communication via the first wireless network using a first communication protocol and a second wireless communication via the second wireless network using a second communication protocol different from first communication protocol.

6. The wireless relay device according to claim 1, wherein, when the manager receives a join request for the second wireless network from a wireless device, the manager is configured to perform a join process for making the wireless device join in the second wireless network.

7. The wireless relay device according to claim 1, wherein the encryption processor is configured to
   decrypt the first data using a different encryption key for each transmission source of the first data, and
   encrypt the second data using a different encryption key for each relay destination of the second data.

8. The wireless relay device according to claim 1, wherein the relay controller is configured to perform a relay control with reference to a relay table in which the transmission source of the first data and the relay destination of the second data are associated with each other.

9. A wireless communication system for performing wireless communication via a wireless network, comprising:
   a wireless relay device according to claim 1; and a gateway set as a transmission destination of the second data in the wireless relay device.

10. The wireless communication system according to claim 9, wherein the gateway is configured to perform a setting of a relay table in which the transmission source of the first data and the relay destination of the second data are associated with each other.

11. The wireless communication system according to claim 9, wherein the relay controller is configured to read the decrypted first data from the first storage and to relay the decrypted first data as the second data to the predetermined relay destination when a predetermined relay condition is satisfied.

12. The wireless communication system according to claim 9, the wireless relay device further comprises:
   an interface, to which an external device is connectable; and
   a controller configured to read the decrypted first data from the first storage and to input the decrypted first data into the interface based on a request from the external device connected to the interface.

13. A wireless relay method for relaying encrypted data via a wireless network, comprising:
   receiving a first data, the first data being transmitted to a wireless relay device via the wireless network and being addressed to the wireless relay device;
   decrypting the first data into a decrypted first data;
   storing the decrypted first data;
   performing a process for relaying the decrypted first data to a predetermined relay destination;
   encrypting the decrypted first data, which has been subjected to the process, into a second data; and
   transmitting the second data to the wireless network,
   wherein the performing the process for relaying the decrypted first data to the predetermined relay destination comprises:
   performing, using network management information, a process for managing a second wireless network different from a first wireless network in which the wireless relay device joins; and
   performing a transmission and reception setting with respect to a transmission source of data and a transmission destination of data based on transmission and reception setting information defining a transmission and reception timing via the second wireless network.

* * * * *